United States Patent
Dubrovsky et al.

(10) Patent No.: US 9,391,828 B1
(45) Date of Patent: Jul. 12, 2016

(54) STORING AND MONITORING COMPUTED RELATIONSHIPS BETWEEN NETWORK COMPONENTS

(75) Inventors: Alex Dubrovsky, Westborough, MA (US); Vikram Patki, Boston, MA (US); Yifeng Chen, Milford, MA (US)

(73) Assignee: EMC Corporation, Hopkinton, MA (US)

(*) Notice: Subject to any disclaimer, the term of this patent is extended or adjusted under 35 U.S.C. 154(b) by 1409 days.

(21) Appl. No.: 11/732,383

(22) Filed: Apr. 2, 2007

(51) Int. Cl.
*H04L 29/08* (2006.01)
*G05B 15/02* (2006.01)
*G05B 19/10* (2006.01)
*H04L 12/24* (2006.01)

(52) U.S. Cl.
CPC .......... *H04L 29/08072* (2013.01); *G05B 15/02* (2013.01); *G05B 19/108* (2013.01); *H04L 41/0213* (2013.01)

(58) Field of Classification Search
CPC ................. G05B 15/02; G05B 19/108; G05B 2219/23056
USPC .................................................. 709/224, 223
See application file for complete search history.

(56) References Cited

U.S. PATENT DOCUMENTS

| | | | |
|---|---|---|---|
| 6,279,037 B1* | 8/2001 | Tams et al. | 709/224 |
| 2002/0083161 A1* | 6/2002 | Miyauchi | 709/223 |
| 2003/0135606 A1* | 7/2003 | Goodwin et al. | 709/224 |
| 2003/0154267 A1* | 8/2003 | Camacho et al. | 709/223 |
| 2004/0024863 A1* | 2/2004 | Connor et al. | 709/224 |
| 2004/0103181 A1* | 5/2004 | Chambliss et al. | 709/223 |
| 2007/0094378 A1* | 4/2007 | Baldwin et al. | 709/223 |
| 2007/0179959 A1* | 8/2007 | Sharma et al. | 707/100 |

* cited by examiner

*Primary Examiner* — Khaled Kassim
(74) *Attorney, Agent, or Firm* — Krishnendu Gupta; Gerald P. Kazanjian

(57) ABSTRACT

Methods and systems of maintaining a computed relationship between components in a network are disclosed. A relationship represents one or more connections between components. Discovered relationships between components in the network are detected. A discovered relationship represents a direct connection between components. A computed relationship between a class of source component and a class of target component is determined. The computed relationship comprises a number of discovered relationships that, when combined, represent connections between one or more types of the source component and one or more types of the target component. The computed relationship is stored. The discovered relationships that comprise the computed relationship are monitored for a change event. The change event may represent a change in the network, such as the addition or deletion of one or more components.

15 Claims, 11 Drawing Sheets

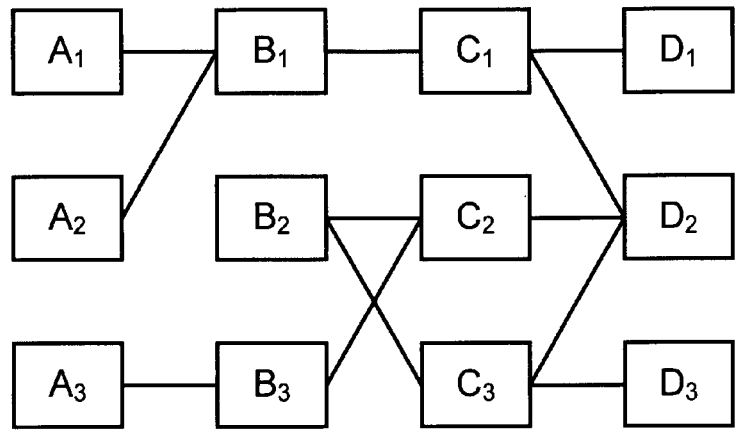

FIG. 2C

```
computed relationshipset ScsiProtocolControllers, CIM_SCSIProtocolCOntroller
= CIM_SCSIProtocolController(
GroupComponent_CIM_SystemDevice_CIM_System
     ->GroupComponent_CIM_LogicalDevice_CIM_SystemDevice
     ->Antecedent_CIM_DeviceSAPImplementation_CIM_LogicalDevice
     ->Antecedent_CIM_ServiceAccessPoint_CIM_DeviceSAPImplementation
     ->AvailableSAP_CIM_SAPAvailableForElement_CIM_ServiceAccessPoint
     ->AvailableSAP_CIM_ManagedElement_CIM_SAPAvailableForElement);
Computed relationshipset ComputedArrays,
    CIM_ComputerSystem = CIM_ComputerSystem (
    ScsiProtocolControllers
    ->Antecedent_CIM_ProtocolControllerForUnit_CIM_ProtocolController
    ->Antecedent_CIM_LogicalDevice_CIM_ProtocolControllerForUnit
    ->PartComponent_CIM_SystemDevice_CIM_LogicalDevice
    ->PartComponent_CIM_System_CIM_SystemDevice);
```

FIG. 2D

MAINTAIN A COMPUTED RELATIONSHIP BETWEEN COMPONENTS IN A NETWORK, WHEREIN A RELATIONSHIP REPRESENTS ONE OR MORE CONNECTIONS BETWEEN COMPONENTS. BY

501 DETECT DISCOVERED RELATIONSHIPS BETWEEN COMPONENTS IN THE NETWORK, WHEREIN A DISCOVERED RELATIONSHIP REPRESENTS A DIRECT CONNECTION BETWEEN COMPONENTS

502 DETERMINE A COMPUTED RELATIONSHIP BETWEEN A CLASS OF SOURCE COMPONENT AND A CLASS OF TARGET COMPONENT, WHEREIN THE COMPUTED RELATIONSHIP COMPRISES A NUMBER OF DISCOVERED RELATIONSHIPS THAT, WHEN COMBINED, REPRESENT CONNECTIONS BETWEEN ONE OR MORE TYPES OF THE SOURCE COMPONENT AND ONE OR MORE TYPES OF THE TARGET COMPONENT

503 STORE THE COMPUTED RELATIONSHIP

504 MONITOR THE DISCOVERED RELATIONSHIPS THAT COMPRISE THE COMPUTED RELATIONSHIP FOR A CHANGE EVENT

505 RECEIVE NOTIFICATION OF A CHANGE EVENT IN A DISCOVERED RELATIONSHIP THAT IS PART OF A COMPUTED RELATIONSHIP

508 RECEIVE NOTIFICATION OF A NEW DISCOVERED RELATIONSHIP THAT MAY BE PART OF A COMPUTED RELATIONSHIP, WHEREIN THE NEW DISCOVERED RELATIONSHIP IS LOCATED AT AN INSERTION POINT IN THE COMPUTED RELATIONSHIP

506 DETERMINE THAT THE CHANGE EVENT REQUIRES THE COMPUTED RELATIONSHIP TO BE UPDATED

507 UPDATE THE STORED COMPUTED RELATIONSHIP TO REFLECT THE CHANGE EVENT

509 TRAVERSE FROM THE INSERTION POINT TO ANY TYPES OF THE SOURCE COMPONENT AND FROM THE INSERTION POINT TO ANY TYPES OF THE TARGET COMPONENT TO DETERMINE SOURCE COMPONENTS AND TARGET COMPONENTS AFFECTED BY THE NEW DISCOVERED RELATIONSHIP

510 DETERMINE ANY NEW COMBINATIONS OF DISCOVERED RELATIONSHIPS THAT INVOLVE ANY AFFECTED SOURCE COMPONENT OR ANY AFFECTED TARGET COMPONENT

511 UPDATE THE STORED COMPUTED RELATIONSHIP TO INCLUDE ANY DETERMINED NEW COMBINATIONS

FIG. 5A

| MAINTAIN A COMPUTED RELATIONSHIP BETWEEN COMPONENTS IN A NETWORK, WHEREIN A RELATIONSHIP REPRESENTS ONE OR MORE CONNECTIONS BETWEEN COMPONENTS, BY |

▼

| 701 DETECT DISCOVERED RELATIONSHIPS BETWEEN COMPONENTS IN THE NETWORK, WHEREIN A DISCOVERED RELATIONSHIP REPRESENTS A DIRECT CONNECTION BETWEEN COMPONENTS |

▼

| 702 DETERMINE A COMPUTED RELATIONSHIP BETWEEN A CLASS OF SOURCE COMPONENT AND A CLASS OF TARGET COMPONENT, WHEREIN THE COMPUTED RELATIONSHIP COMPRISES A NUMBER OF DISCOVERED RELATIONSHIPS THAT, WHEN COMBINED, REPRESENT CONNECTIONS BETWEEN ONE OR MORE TYPES OF THE SOURCE COMPONENT AND ONE OR MORE TYPES OF THE TARGET COMPONENT |

▼

| 703 STORE THE COMPUTED RELATIONSHIP |
| 705 STORE THE COMPUTED RELATIONSHIP AND A COMPLETE PATH OF EACH COMBINATION OF DISCOVERED RELATIONSHIPS THAT COMPRISE THE COMPUTED RELATIONSHIP |

▼

| 704 MONITOR THE DISCOVERED RELATIONSHIPS THAT COMPRISE THE COMPUTED RELATIONSHIP FOR A CHANGE EVENT |
| 706 RECEIVE NOTIFICATION OF A CHANGE EVENT IN A DISCOVERED RELATIONSHIP THAT IS PART OF A COMPUTED RELATIONSHIP |
| 709 RECEIVE NOTIFICATION OF A NEW DISCOVERED RELATIONSHIP THAT MAY BE PART OF A COMPUTED RELATIONSHIP |
| 707 DETERMINE THAT THE CHANGE EVENT REQUIRES THE COMPUTED RELATIONSHIP TO BE UPDATED |
| 708 UPDATE THE STORED COMPUTED RELATIONSHIP AND ANY STORED PATH OF A COMBINATION OF DISCOVERED RELATIONSHIPS AFFECTED BY THE CHANGE EVENT |
| 710 SEARCH EACH STORED PATH OF EACH COMBINATION OF DISCOVERED RELATIONSHIPS TO DETERMINE ANY PATHS THAT MAY BE MODIFIED TO INCLUDE THE NEW DISCOVERED RELATIONSHIP |
| 711 FOR EACH DETERMINED PATH, CREATE A NEW PATH OF DISCOVERED RELATIONSHIPS BASED ON AN EXISTING PATH AND THE NEW DISCOVERED RELATIONSHIP |
| 712 UPDATE THE STORED PATHS TO INCLUDE EACH NEW CREATED PATH OF DISCOVERED RELATIONSHIPS |

FIG. 7A

```
┌─────────────────────────────────────────────────────────────┐
│ MAINTAIN A COMPUTED RELATIONSHIP BETWEEN STORAGE AREA        │
│ NETWORK COMPONENTS IN A STORAGE AREA NETWORK, WHEREIN A      │
│ RELATIONSHIP REPRESENTS ONE OR MORE CONNECTIONS BETWEEN      │
│ STORAGE AREA NETWORK COMPONENTS, BY                          │
└─────────────────────────────────────────────────────────────┘
                              ▼
┌─────────────────────────────────────────────────────────────┐
│ 801 DISCOVER RELATIONSHIPS BETWEEN STORAGE AREA NETWORK      │
│ COMPONENTS IN THE STORAGE AREA NETWORK, WHEREIN A DISCOVERED │
│ RELATIONSHIP REPRESENTS A DIRECT CONNECTION BETWEEN STORAGE  │
│ AREA NETWORK COMPONENTS                                      │
└─────────────────────────────────────────────────────────────┘
                              ▼
┌─────────────────────────────────────────────────────────────┐
│ 802 DETERMININE A COMPUTED RELATIONSHIP BETWEEN A CLASS OF   │
│ SOURCE STORAGE AREA NETWORK COMPONENT AND A CLASS OF TARGET  │
│ STORAGE AREA NETWORK COMPONENT, WHEREIN THE COMPUTED         │
│ RELATIONSHIP COMPRISES A NUMBER OF DISCOVERED RELATIONSHIPS  │
│ THAT, WHEN COMBINED, REPRESENT CONNECTIONS BETWEEN ONE OR    │
│ MORE TYPES OF THE SOURCE STORAGE AREA NETWORK COMPONENT      │
│ AND ONE OR MORE TYPES OF THE TARGET STORAGE AREA NETWORK     │
│ COMPONENT                                                    │
└─────────────────────────────────────────────────────────────┘
                              ▼
┌─────────────────────────────────────────────────────────────┐
│ 803 STORE THE COMPUTED RELATIONSHIP                          │
└─────────────────────────────────────────────────────────────┘
                              ▼
┌─────────────────────────────────────────────────────────────┐
│ 804 MONITOR THE DISCOVERED RELATIONSHIPS THAT COMPRISE THE   │
│ COMPUTED RELATIONSHIP FOR A CHANGE EVENT, WHEREIN A CHANGE   │
│ EVENT REFLECTS A CHANGE IN THE STORAGE AREA NETWORK          │
└─────────────────────────────────────────────────────────────┘
```

FIG. 8

STORING AND MONITORING COMPUTED RELATIONSHIPS BETWEEN NETWORK COMPONENTS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. Additional software applications may interact with ECC to obtain information that may be used by a user to design and refine the configuration of the storage area network, such as the SAN Advisor and Common Management Platform families of products, also available from EMC Corporation of Hopkinton, Mass.

It is possible to model any kind of network, including a storage area network, by representing the connections between the components of the network as relationships between those components. In other words, a relationship may be considered to be a model of a connection between components in a network. To create such a model for a network, the network must be explored in some manner to discover all relationships between components. This may be achieved, for example, by examining current connections in the network. Once all such relationships have been discovered, computed relationships may be calculated from existing relationships between components. These computed relationships may be stored in a database.

SUMMARY

The components of a network, such as a SAN, may be constantly undergoing changes. For example, a component may fail and need to be removed from the network, or temporarily de-activated to address the failure. A new component may be added in place of a failed component, or new components may be added to expand upon already existing network capabilities, or new components may be added to add new network capabilities. When a network is modeled such that each connection between components is represented by a relationship, any changes to the network may change the relationships between components. Additionally, if there are computed relationships based on the model of the network, these too may be changed if any component relationships are themselves changed. Conventional technologies address the potential occurrence of so many changes by re-calculating a computed relationship every time that computed relationship is queried by a network management tool. Constant re-calculations of computed relationships lead to an inefficient use of processing resources, and may additionally bog down a network management tool, resulting in poor performance of the tool and a limitation on an administrator's ability to properly manage the network. Additionally, the larger and more complicated a network is, and the more computed relationships that have been calculated for that network, the more resources that are need to re-calculate computed relationships over time.

Embodiments disclosed below provide for storing computed relationships and monitoring changes that occur to them in such a way that re-calculation of a computed relationship each time that relationship is queried is no longer necessary. Instead of re-calculating a computed relationship, the results of the calculation are stored, in a database or other type of storage device. To account for changes that may occur to the network, all the discovered relationships within the model are monitored. That is, all the relationships that represent an actual connection between components, whatever that connection may be, are monitored for changes. Should a change of any kind be detected, the stored computed relationship may need to be updated. How the stored computed relationship is updated depends on the type of change that has occurred, and may also depend on how the computed relationship is stored. It should be noted that not all changes to the network will require changes to a stored computed relationship, and that a stored computed relationship may not be updated without first determining whether or not the change requires an update.

More particularly, in an embodiment there is provided a method of maintaining a computed relationship between components in a network, wherein a relationship represents one or more connections between components. The method includes detecting discovered relationships between components in the network, wherein a discovered relationship represents a direct connection between components; determining a computed relationship between a class of source component and a class of target component, wherein the computed relationship comprises a number of discovered relationships that, when combined, represent connections between one or more types of the source component and one or more types of the target component; storing the computed relationship; and monitoring the discovered relationships that comprise the computed relationship for a change event.

In a related embodiment, monitoring may include receiving notification of a change event in a discovered relationship that is part of a computed relationship; determining that the change event requires the computed relationship to be updated; and updating the stored computed relationship to reflect the change event.

In a further related embodiment, the network may be a storage area network and components may be storage area network components. Detecting may include discovering relationships between storage area network components in the storage area network, wherein a discovered relationship represents a direct connection between storage area network components. Determining may include determining a computed relationship between a class of source storage area network component and a class of target storage area network component, wherein the computed relationship comprises a number of discovered relationships that, when combined, represent connections between one or more types of the source storage area network component and one or more types of the target storage area network component. Monitoring may include monitoring the discovered relationships that comprise the computed relationship for a change event, wherein a change event reflects a change in the storage area network.

In another further related embodiment, receiving may include receiving notification of a new discovered relationship that may be part of a computed relationship, wherein the new discovered relationship is located at an insertion point in the computed relationship; and updating may include traversing from the insertion point to any types of the source component and from the insertion point to any types of the target component to determine source components and target components affected by the new discovered relationship; determining any new combinations of discovered relationships that involve any affected source component or any affected target component; and updating the stored computed relationship to include any determined new combinations. In yet another further related embodiment, receiving may include receiving notification of a removed discovered relationship that may be part of a computed relationship; and updating may include traversing from a location of the removed discovered relationship to any types of source components connected through one or more discovered relationships with the removed discovered relationship; for each type of source component traversed to, determining each combination of discovered relationships that include that source component; and updating the stored computed relationship to remove any combination of discovered relationships including a source component traversed to that were not determined.

In another related embodiment, storing may include storing the computed relationship and each instantiation of the computed relationship, wherein an instantiation of the computed relationship includes a type of source component matched with a type of target component.

In yet another related embodiment, storing may include storing the computed relationship and a complete path of each combination of discovered relationships that comprise the computed relationship. In a further related embodiment, monitoring may include receiving notification of a change event in a discovered relationship that is part of a computed relationship; determining that the change event requires the computed relationship to be updated; and updating the stored computed relationship and any stored path of a combination of discovered relationships affected by the change event.

In another further related embodiment, receiving may include receiving notification of a new discovered relationship that may be part of a computed relationship; and updating may include searching each stored path of each combination of discovered relationships to determine any paths that may be modified to include the new discovered relationship; for each determined path, creating a new path of discovered relationships based on an existing path and the new discovered relationship; and updating the stored paths to include each new created path of discovered relationships.

In still another further related embodiment, receiving may include receiving notification of a removed discovered relationship that may be part of a computed relationship; and updating may include searching each stored path of each combination of discovered relationships for the removed discovered relationship identified in the notification; and updating the stored paths to remove each stored path that contains the removed discovered relationship.

In another embodiment, there is provided a computer system including a memory, a processor, a display, and an interconnection mechanism coupling the memory, the processor and the display allowing communication there between. The memory of the computer system is encoded with a computed relationship maintaining application, that when executed in the processor, provides a computed relationship maintaining process that maintains a computed relationship between components in a network, wherein a relationship represents one or more connections between components, by causing the computer system to perform operations of: detecting discovered relationships between components in the network, wherein a discovered relationship represents a direct connection between components; determining a computed relationship between a class of source component and a class of target component, wherein the computed relationship comprises a number of discovered relationships that, when combined, represent connections between one or more types of the source component and one or more types of the target component; storing the computed relationship; and monitoring the discovered relationships that comprise the computed relationship for a change event.

In yet another embodiment, there is provided a computer program product, stored on computer readable medium, to maintain a computed relationship between components in a network, wherein a relationship represents one or more connections between components. The computer program product includes computer program code for detecting discovered relationships between components in the network, wherein a discovered relationship represents a direct connection between components; computer program code for determining a computed relationship between a class of source component and a class of target component, wherein the computed relationship comprises a number of discovered relationships that, when combined, represent connections between one or more types of the source component and one or more types of the target component; computer program code for storing the computed relationship; and computer program code for monitoring the discovered relationships that comprise the computed relationship for a change event.

It is to be understood that the system of the present application can be embodied solely as a software program, or as a software program operating in conjunction with corresponding hardware. For example, embodiments of the present application may be implemented in EMC's Common Management Platform software application that provides graphical configuration management functionality of network resources. Embodiments of the present application may also be implemented in computer devices that operate the Common Management Platform software. Common Management Platform software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A-2C are graphical examples of a model network its component parts and relationships between those components, as described herein, and maintained by a software application that executes on the computer system depicted in FIG. 1.

FIG. 2D illustrates example code that defines a computed relationship that is maintained by a software application that executes on the computer system depicted in FIG. 1.

FIGS. 5A and 5B illustrate a flowchart of a procedure performed by the system of FIG. 1 when changes made include the addition of a new discovered relationship and the removal of an existing discovered relationship, respectively.

FIG. 8 illustrates a flowchart of a procedure performed by the system of FIG. 1 when the network modeled with relationships is a storage area network.

DETAILED DESCRIPTION

Generally, disclosed embodiments provide for storing computed relationships and monitoring changes that occur to them in such a way that re-calculation of a computed relationship each time that relationship is queried is no longer necessary. Instead of re-calculating a computed relationship every time that computed relationship is queried, a computed relationship is calculated once, and the results of the calculation are stored, in a database or other type of storage device. To account for changes that may occur to the network, all the discovered relationships within the model are monitored. That is, all the relationships that represent an actual connection between components, whatever that connection may be, are monitored for changes. Should a change of any kind be detected, the stored computed relationship may need to be updated. How the stored computed relationship is updated depends on the type of change that has occurred, and may also depend on how the computed relationship is stored. It should be noted that not all changes to the network will require changes to a stored computed relationship, and that a stored computed relationship may not be updated without first determining whether or not the change requires an update.

Figure 1:
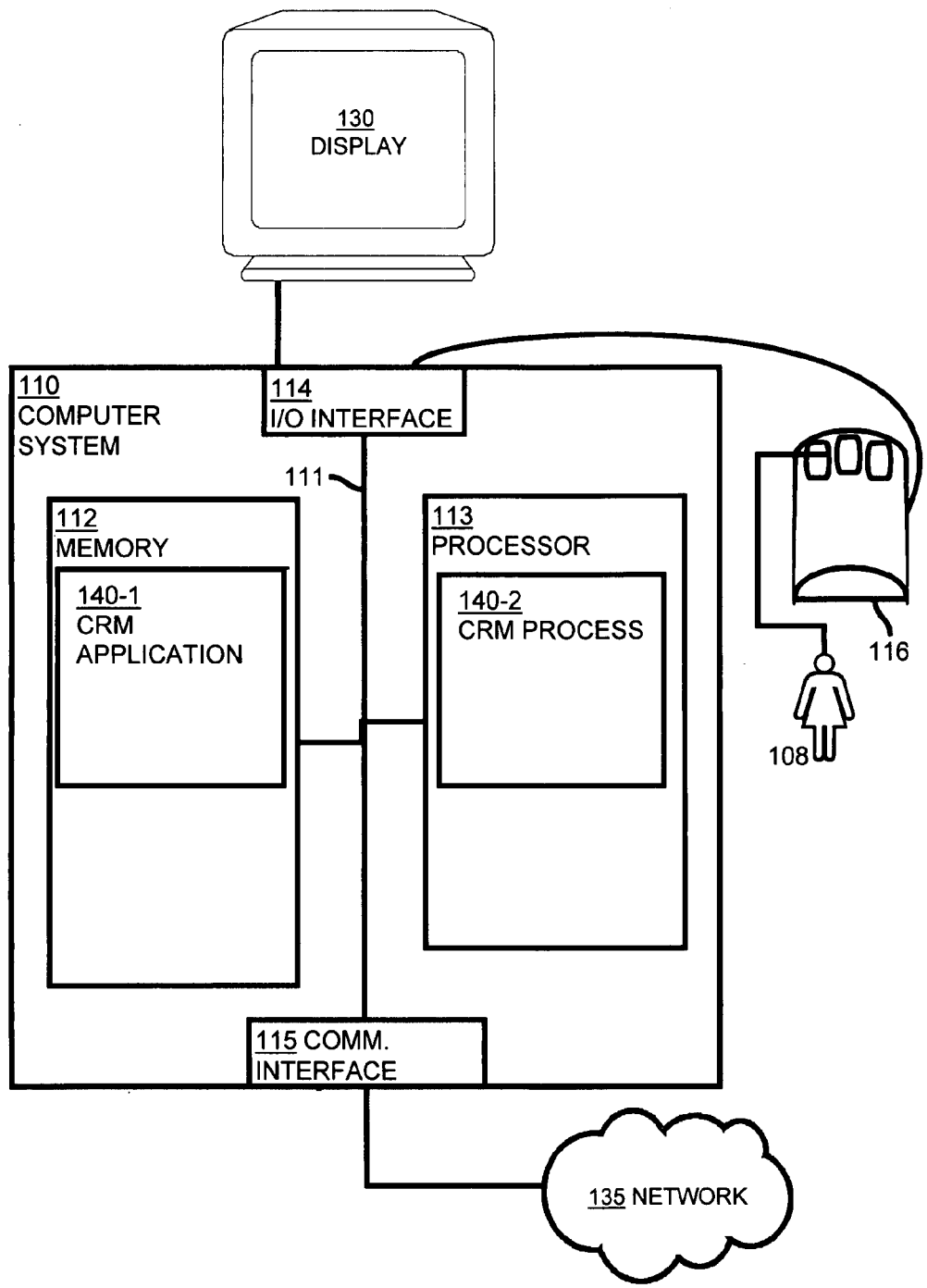
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a CRM application 140-1 and a CRM process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a network 135 to provide input commands and generally administer the network 135 through, for example, a graphical user interface that may be provided on a display 130. The communications interface 115 enables the computer system 110 to communicate with other devices on the network 135.

The memory system 112 is any type of computer readable medium and in this example is encoded with a CRM application 140-1 that includes CRM process 140-2. The CRM application 140-1 may be embodied as software code such as data and/or logic instructions (e.g., code stored in the memory system 112 or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the CRM application 140-1. Execution of the CRM application 140-1 in this manner produces processing functionality in a CRM process 140-2. In other words, the CRM process 140-2 represents one or more portions or runtime instances of the CRM application 140-1 performing or executing within or upon the processor 113 in the computer system 110 at runtime.

It is noted that example configurations disclosed herein include the CRM application 140-1 itself including the CRM process 140-2 (i.e., in the form of un-executed or non-performing logic instructions and/or data). The CRM application 140-1 may be stored on a computer readable medium (such as a floppy disk), hard disk, electronic, magnetic, optical or other computer readable medium. The CRM application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the CRM application 140-1 in the processor 113 as the CRM process 140-2. Those skilled in the art will understand that the computer system 110 may include other processes and/or software and hardware components, such as an operating system not shown in this example.

Figure 2A:
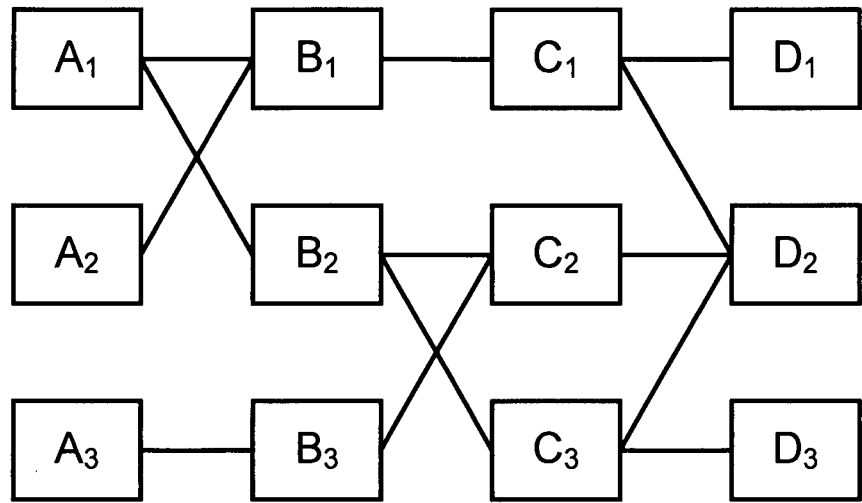
Figure 2B:
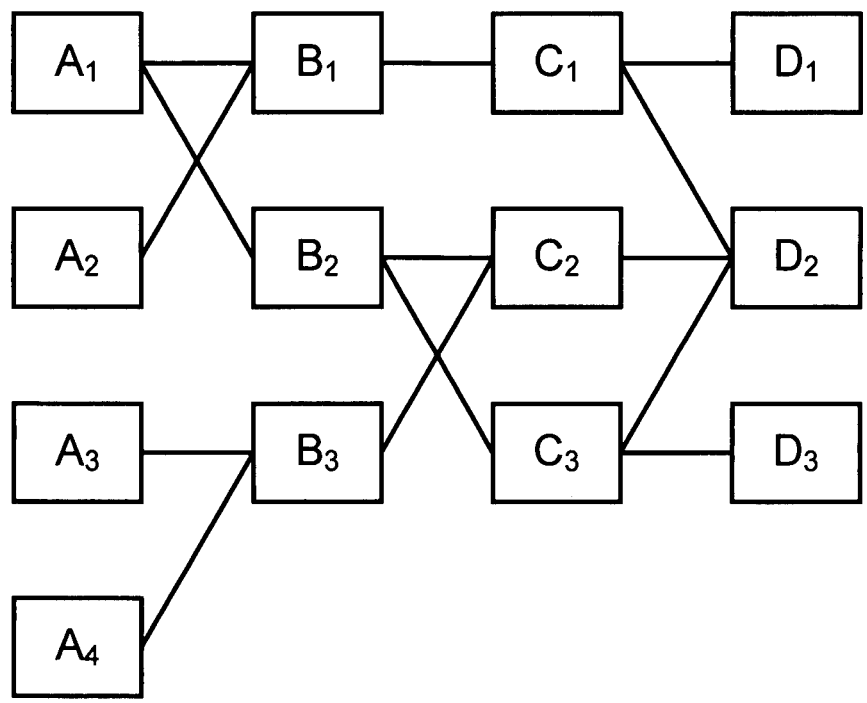

FIGS. 2A-2C are examples of models of networks according to embodiments described herein. FIG. 2D is example code for defining a computed relationship according to embodiments described herein. FIGS. 3-8 illustrate flowcharts of an embodiment of the CRM application 140-1 as performed by the computer system of FIG. 1.

In FIG. 2A, an example model of components of a network according to embodiments described herein is shown. Each block 200 in the model represents a different component in the network. The blocks 200 are identified by letters, each letter further including a subscript, where each letter stands for a different class of component. For example, all blocks 200 denoted with a capital A may be an edge router, or if the network is a storage area network, a host. The different subscripts assigned to each identifying letter of each block 200 represent a particular component in the network. Each line 210 connecting two blocks 200 represents a relationship between the blocks. A relationship indicates that the actual network components represented by the blocks 200 are actually connected in some way, such as but not limited to a wired connection, a wireless connection, or a direct connection, such as a card plugged directly into a device. More particularly, each line 210 represents a discovered relationship, that is, a connection between two components that may be discovered, either by a software application that probes the network, seeking connections, or by visual identification. It is possible to join a number of discovered relationships together to form a computed relationship, as is explained in further detail below.

Figure 3:
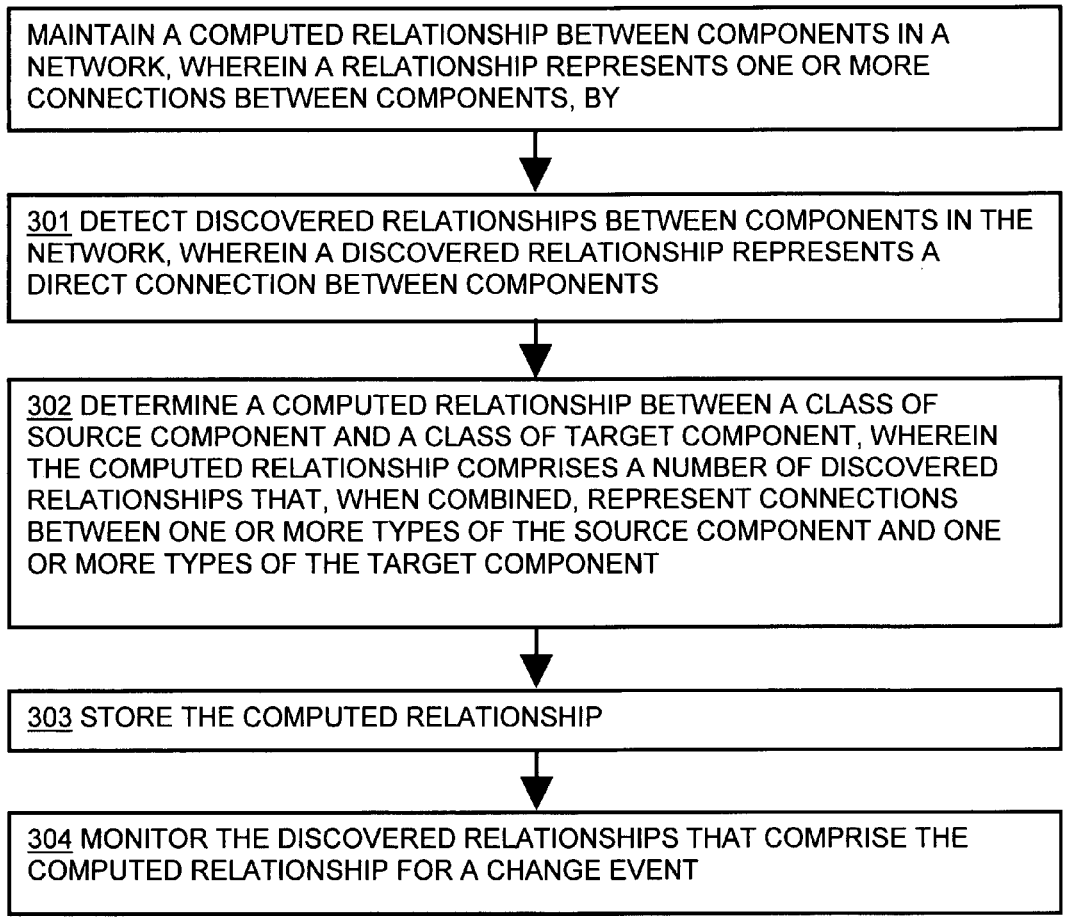
FIG. 3 illustrates a flowchart of a procedure performed by the system of FIG. 1 when maintaining computed relationships.

The CRM application 140-1, executing as the resulting CRM process 140-2, is able to determined computed relationships, as is shown by the flowchart of FIG. 3. The CRMP detects discovered relationships between components in the network, step 301. As discussed above, a discovered relationship represents a direct connection between components of the network. Referring to the example network model shown in FIG. 2A, any two components (represented by blocks 200) that are connected via line 210 have a discovered relationship. Information about each discovered relationship in the network, as well as the network components, may be gathered by a different application and stored in a database that the CRMP has access to. The CRMP may then access this database to obtain the needed information. Alternatively, the CRMP may itself perform a probe of the network to detect discovered relationships.

The CRMP then determines a computed relationship, step 302. The CRMP determines a computed relationship between a class of source component and a class of target component. In the example network model shown in FIG. 2A, the components denoted with the letter A are the source components, and the components denoted with the letter D are the target components. The letters A and D, respectively, identify the class of the component. The computed relationship is represented according to those identifiers, in this case, the letters A and D, such that the relationship is known as A→D. Each instantiation of the computed relationship is also determined. For the ENM2a, the instantiations include $A_1 \rightarrow D_1$, $A_1 \rightarrow D_2$, $A_1 \rightarrow D_3$, $A_2 \rightarrow D_1$, $A_2 \rightarrow D_2$, and $A_3 \rightarrow D_2$. In other words, a computed relationship comprises a number of discovered relationships that, when combined, represent connections between one or more types of the source component and one or more types of the target component. Again referring to the ENM2a, the discovered relationships $A_1 \rightarrow B_1$, $B_1 \rightarrow C_1$, and $C_1 \rightarrow D_1$ may be combined to form the instantiation $A_1 \rightarrow D_1$ of the computed relationship A→D. $A_1 \rightarrow B_1$, $B_1 \rightarrow C_1$, and $C_1 \rightarrow D_1$ may be referred to as a path of the combination of discovered relationships that forms the computed relationship A→D. Many other such paths are obviously possible, as is discussed in greater detail below.

The CRMP then stores the computed relationship, step 303, and monitors the discovered relationships that comprise the computed relationship for a change event, step 304. This monitoring is described in greater detail with regards to the flowcharts shown in FIGS. 4, 5A, and 5B.

Figure 4:
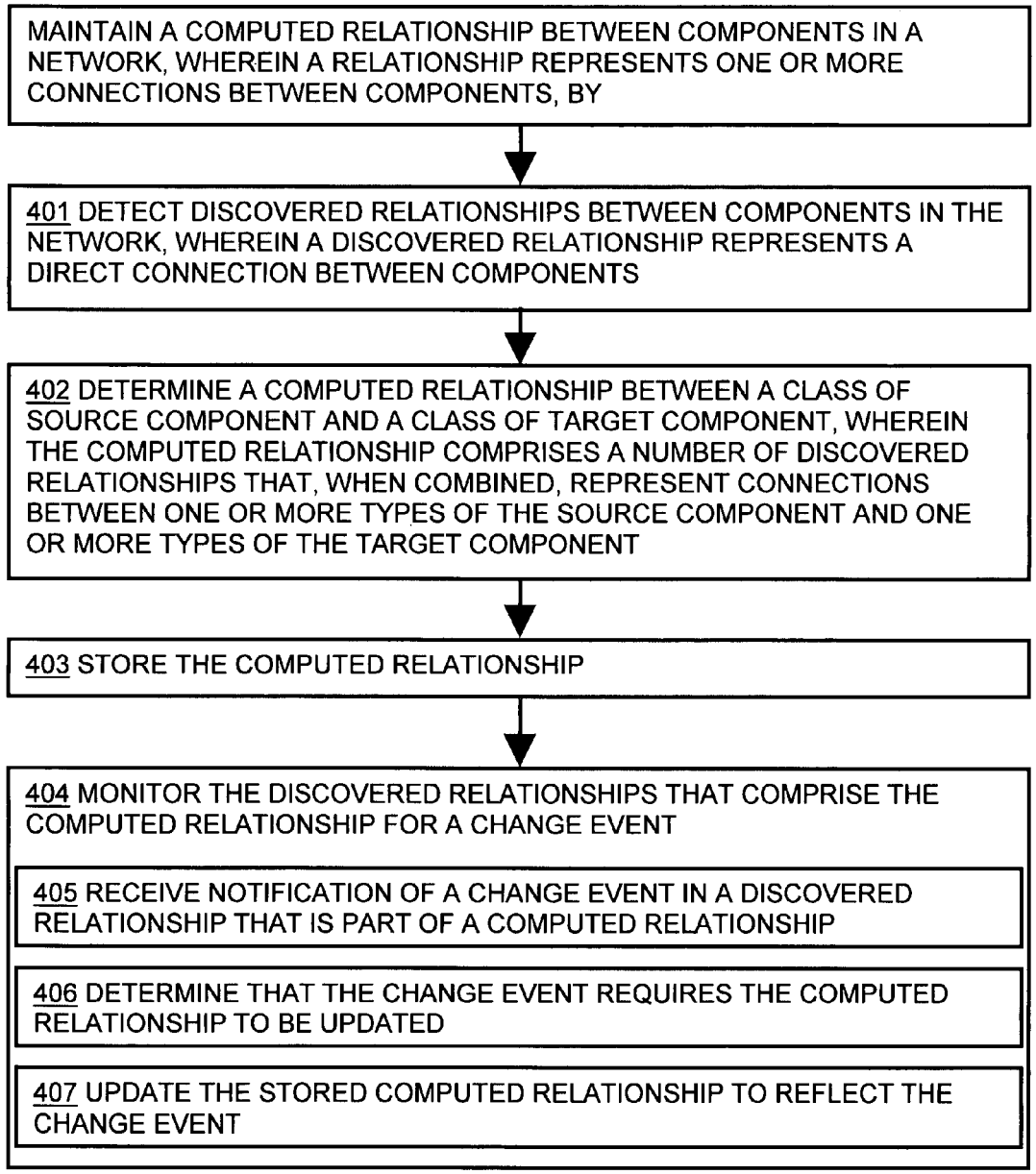
FIG. 4 illustrates a flowchart of a procedure performed by the system of FIG. 1 when monitoring discovered relationships that comprise a computed relationship for any changes that would require a stored computed relationship to be updated.

In FIG. 4, the CRMP performs the same steps as in FIG. 3 (here denoted steps 401, 402, 403, and 404). While monitoring the discovered relationships, the CRMP may receive notification of a change event in a discovered relationship that is part of a computed relationship, step 405. A change event represents some type of change in the network modeled by the computed relationships. For example, one or more components may be added to increase network capabilities or to add new capabilities. Alternatively, one or more existing components may be removed from the network, due to failure, wear, age, or for any other reason. Components need not be added or removed, however, for there to be a change event. The connections between components, which are represented by the relationships in the model, may themselves be added or removed. For example, if a wired connection between two routers in a network fails for any reason, such as but not limited to the wire being severed, there will no longer be a relationship between those two components. Alternatively, a wired connection may be added between two routers that were not previously connected, in which case there is a new relationship between the components. It is important to note that the CRMP monitors the status of relationships (that is, connections between components) as opposed to monitoring the status of components themselves. If the CRMP cannot communicate with a component for any reason, whether the issue is with the component itself or the connection that is modeled by the relationship is irrelevant.

Each different type of change that may occur is independently noted and results in a separate notification, though it may be possible to combine notifications to include multiple change events, either of the same type or of different types. In such a situation, the CRMP must be modified appropriately to address the number and types of change events in a notification, by modifying the steps described in greater detail below.

Whatever type of change event has occurred that resulted in the CRMP receiving a notification, the CRMP will then determine if the change event requires the computed relationship to be updated. In situations where the CRMP determines that the change event requires the computed relationship to be updated, step 406, the CRMP will then update the stored computed relationship to reflect the change event, step 407. In other situations, the CRMP may determine that the change event requires no updates to a computed relationship, in which case the CRMP simply continues to monitor the discovered relationships until another notification of a change event is received.

Figure 5B:
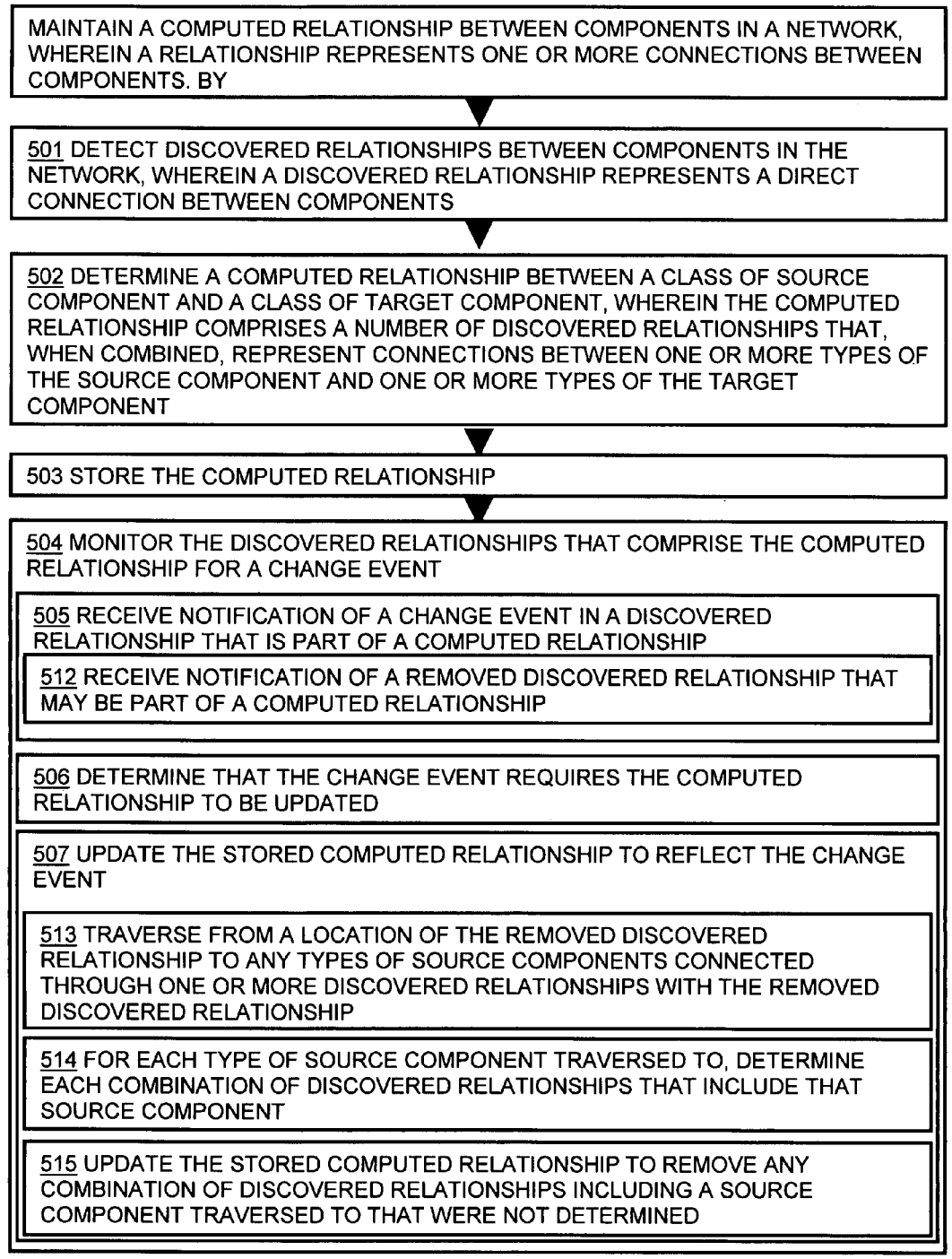
Figure 6:
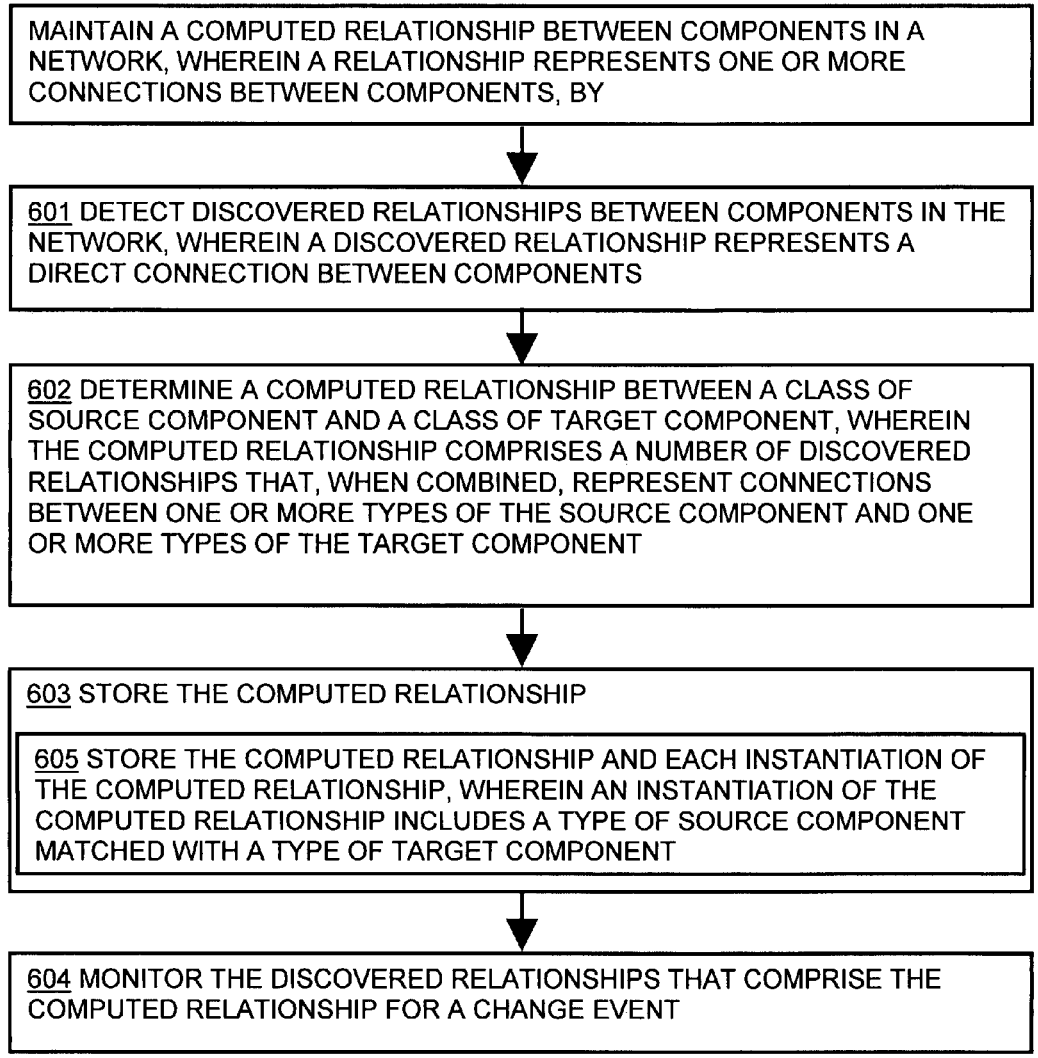
FIG. 6 illustrates a flowchart of a procedure performed by the system of FIG. 1 when storing a computed relationship and its instantiations.

FIGS. 5A and 5B describe two different types of change events for which the CRMP may receive a notification, and how the CRMP updates a computed relationship, if necessary, in response. In FIG. 5A, the CRMP receives notification of change event that is a new discovered relationship that may be part of a computed relationship, step 508. The new discovered relationship is located at an insertion point in the computed relationship. Referring now to the example model of a network shown in FIG. 2B, a new component, denoted by a block 200 labeled $A_4$ has been added to the network. The component labeled $A_4$ has a discovered relationship with the component labeled $B_3$, as denoted by the line 210. The insertion point of this new discovered relationship is the point at which the new discovered relationship connects with an existing component. In the example model network of FIG. 2B, this means the insertion point is located at the component denoted $B_3$. Thus, the computed relationship $A \rightarrow D$ has changed, in that there may be one or more new instantiations of the computed relationship. Having determined, in step 506, that the change event requires the computed relationship to be updated, the CRMP will first traverse from the insertion point to any types of the source component and from the insertion point to any types of the target component to determine source components and target components affected by the new discovered relationship, step 509. Referring again to FIG. 2B, the CRMP will thus traverse from $B_3$ back to $A_3$ and $A_4$, which identifies the affected source components, $A_3$ and $A_4$. The CRMP will also traverse from $B_3$ ahead to $D_2$, which identifies the affected target component, $D_2$. Because $B_3$ is not connected to any other source components or any other target components, the addition of component $A_4$ and its discovered relationship with $B_3$ is not able to affect those source components or target components.

The CRMP will then determine any new combinations of discovered relationships that involve any affected source component or any affected target component, step 510. Referring again to FIG. 2B, the CRMP determines that the combination of $A_4 \rightarrow B_3$, $B_3 \rightarrow C_2$, and $C_2 \rightarrow D_2$ is a new combination of discovered relationships that involves both an affected source component, $A_4$, and an affected target component, $D_2$. Such new combinations need not involved both an affected source component and an affected target component, and may instead involve only one or the other. The CRMP then updates the stored computed relationship to include any determined new combinations, step 511, which is here denoted by $A_4 \rightarrow D_2$.

Alternatively, in FIG. 5B, the CRMP receives notification of change event that is a removed discovered relationship that may be part of a computed relationship, step 512. Referring now to the example model of a network shown in FIG. 2C, a relationship that was present in FIG. 2A has been removed. Namely, the relationship representing the connection between the components denoted by the blocks 200 labeled $A_1$ and $B_2$ has been removed from the network. Thus, the computed relationship $A \rightarrow D$ has changed, in that there may be one or more existing instantiations of the computed relationship that are no longer valid. Having determined, in step 506, that the change event requires the computed relationship to be updated, the CRMP will first traverse from a location of the removed discovered relationship to any types of source components connected through one or more discovered relationships with the removed discovered relationship, step 513. In this situation, the location of the removed discovered relationship is defined to be where the connection represented by the removed discovered relationship began. Referring again to FIG. 2C, in this example model, the CRMP will thus traverse from $A_1$ back to itself. Depending on the discovered relationship that is removed and the model of the network, other source components may be found; only one need not be found.

The CRMP will then, for each type of source component traversed to, determine each combination of discovered relationships that include that source component, step 514. Here, the CRMP will determine that $A_1$ connects to $D_1$ and that $A_1$ connects to $D_2$. As can be seen in FIG. 2C, with the removal of the $A_1 \rightarrow B_2$ relationship, it is no longer possible for $A_1$ to connect to $D_3$. Finally, the CRMP update the stored computed relationship to remove any combination of discovered relationships including a source component traversed to that were not determined, step 515. Here, the CRMP will remove the $A_1 \rightarrow D_3$ combination.

Figure 7B:
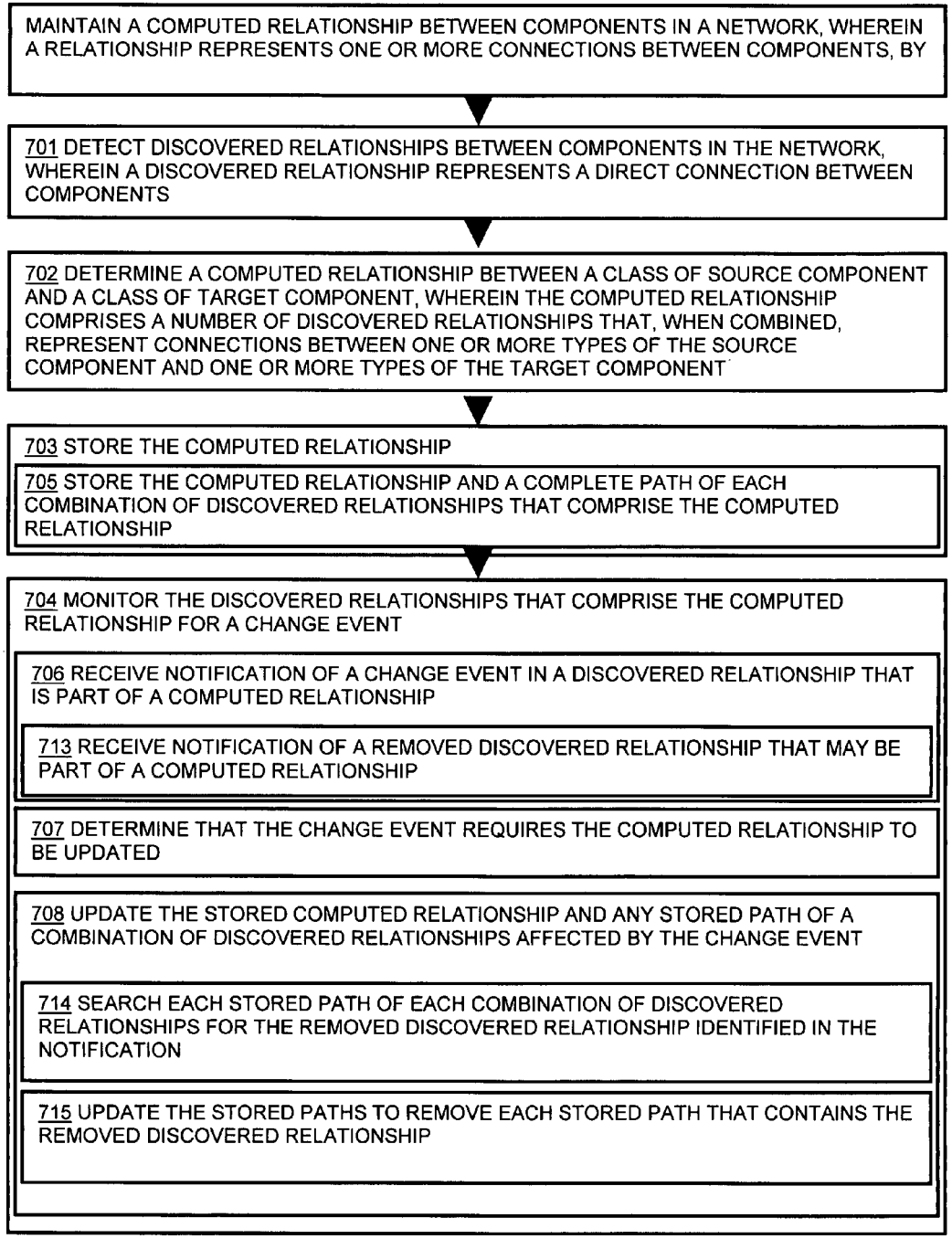
FIG. 7 illustrates a flowchart of a procedure performed by the system of FIG. 1 when storing a computed relationship and the paths that form its instantiations, and what happens when changes occur in the network.

As stated above, the CRMP may store more than just the computed relationship. For example, in FIG. 6, the CRMP stores not only the computed relationship, step 603, but also stores each instantiation of the computed relationship, step 605. As discussed above, an instantiation of the computed relationship includes a type of source component matched with a type of target component, such as (referring back to FIG. 2A) $A_1 \rightarrow D_2$. Another example is shown in FIG. 7, where the CRMP stores not only the computed relationship, step 703, but also stores a complete path of each combination of discovered relationships that comprise the computed relationship, step 70X. As discussed above, a path is the chain of connections that are modeled by the discovered relationships that, when joined together, show an instantiation of a computed relationship. Referring back to FIG. 2A, one such path may be $A_1 \rightarrow B_1$, $B_1 \rightarrow C_1$, and $C_1 \rightarrow D_1$.

When the CRMP stores all such paths, the CRMP has alternate methodologies available by which it may update a stored computed relationship. Referring again to FIG. 7, the CRMP monitors discovered relationships, step 704, as described previously with regards to FIG. 4. That is, the CRMP receives notification of a change event in a discovered relationship that is part of a computed relationship, step 705, determines that the change event requires the computed relationship to be updated, step 706, and then updates the stored computed relationship and any stored path of a combination of discovered relationships affected by the change event, step 707. Here, were the CRMP stores paths, when the CRMP receives notification of a new discovered relationship that may be part of a computed relationship, step 708, the CRMP performs a different methodology to update a computed relationship, if necessary.

First, the CRMP searches each stored path of each combination of discovered relationships to determine any paths that may be modified to include the new discovered relationship, step 709. Referring again to FIG. 2A, the stored paths would be as follows: $A_1 \rightarrow B_1$, $B_1 \rightarrow C_1$, and $C_1 \rightarrow D_1$; $A_1 \rightarrow B_1$, $B_1 \rightarrow C_1$, and $C_1 \rightarrow D_2$; $A_1 \rightarrow B_2$, $B_2 \rightarrow C_2$, and $C_2 \rightarrow D_2$; $A_1 \rightarrow B_2$, $B_2 \rightarrow C_3$, and $C_3 \rightarrow D_2$; $B_2 \rightarrow C_3$, and $C_3 \rightarrow D_3$; $A_2 \rightarrow B_1$, $B_1 \rightarrow C_1$, and $C_1 \rightarrow D_1$; $A_2 \rightarrow B_1$, $B_1 \rightarrow C_1$, and $C_1 \rightarrow D_2$; and $A_3 \rightarrow B_3$, $B_3 \rightarrow C_2$, and $C_2 \rightarrow D_2$. The CRMP would determine that any path including $B_3$, the insertion point of the new discovered relationship, could be modified. Thus, the only path that the CRMP would determine may be modified is $A_3 \rightarrow B_3$, $B_3 \rightarrow C_2$, and $C_2 \rightarrow D_2$. Then, for each determined path, the CRMP creates a new path of discovered relationships based on an existing path and the new discovered relationship, step 710. Again referring to FIG. 2B, the CRMP would create a new path, namely $A_4 \rightarrow B_3$, $B_3 \rightarrow C_2$, and $C_2 \rightarrow D_2$ that incorporated the new $A_4 \rightarrow B_3$ relationship and the one existing path that included $B_3$. Finally, the CRMP updates the stored paths to include each new created path of discovered relationships, step 711. In other words, the CRMP now stores the new path $A_4 \rightarrow B_3$, $B_3 \rightarrow C_2$, and $C_2 \rightarrow D_2$ along with the other paths described above.

As with other methodologies, the CRMP may alternatively receive notification of a removed discovered relationship that may be part of a computed relationship, step 712. Referring back to FIG. 2C, the discovered relationship between $A_1$ and $B_2$ has been removed. In this situation, the CRMP performs the following steps to update a stored computed relationship, if necessary. First, the CRMP searches each stored path of each combination of discovered relationships for the removed discovered relationship identified in the notification, step 713. Referring now to FIG. 2A, the stored paths would be as follows: $A_1 \rightarrow B_1$, $B_1 \rightarrow C_1$, and $C_1 \rightarrow D_1$; $A_1 \rightarrow B_1$, $B_1 \rightarrow C_1$, and $C_1 \rightarrow D_2$; $A_1 \rightarrow B_2$, $B_2 \rightarrow C_2$, and $C_2 \rightarrow D_2$; $A_1 \rightarrow B_2$, $B_2 \rightarrow C_3$, and $C_3 \rightarrow D_2$; $A_1 \rightarrow B_2$, $B_2 \rightarrow C_3$, and $C_3 \rightarrow D_3$; $A_2 \rightarrow B_1$, $B_1 \rightarrow C_1$, and $C_1 \rightarrow D_1$; $A_2 \rightarrow B_1$, $B_1 \rightarrow C_1$, and $C_1 \rightarrow D_2$; and $A_3 \rightarrow B_3$, $B_3 \rightarrow C_2$, and $C_2 \rightarrow D_2$. The CRMP would search for any paths that included the now removed discovered relationship $A_1 \rightarrow B_2$. Thus, the CRMP would find three such paths: $A_1 \rightarrow B_2$, $B_2 \rightarrow C_2$, and $C_2 \rightarrow D_2$; $A_1 \rightarrow B_2$, $B_2 \rightarrow C_3$, and $C_3 \rightarrow D_2$; and $A_1 \rightarrow B_2$, $B_2 \rightarrow C_3$, and $C_3 \rightarrow D_3$. Finally, the CRMP updates the stored paths to remove each stored path that contains the removed discovered relationship, step 714. In other words, the CRMP would delete the paths $A_1 \rightarrow B_2$, $B_2 \rightarrow C_2$, and $C_2 \rightarrow D_2$; $A_1 \rightarrow B_2$, $B_2 \rightarrow C_3$, and $C_3 \rightarrow D_2$; and $A_1 \rightarrow B_2$, $B_2 \rightarrow C_3$, and $C_3 \rightarrow D_3$ from the list of stored paths given above. Note here that while two paths that connected $A_1$ with $D_2$ were removed, because one path remains that connects those components (namely, $A_1 \rightarrow B_2$, $B_2 \rightarrow C_2$, and $C_2 \rightarrow D_2$), the instantiation $A_1 \rightarrow D_2$ is still possible in this computed relationship, while the instantiation $A_1 \rightarrow D_3$ is no longer possible, because there is now no path from $A_1$ to $D_3$.

One particular type of network to which the CRMP is particularly well-suited is a storage area network. FIG. 8 shows an example methodology the CRMP may use when maintaining computed relationships between storage area network components of a storage area network. In particular, the CRMP detects relationships by discovering relationships between storage area network components in the storage area network, wherein a discovered relationship represents a direct connection between storage area network components, step 801. The CRMP may be part of a storage area network management platform, such as ECC, in which case the CRMP may take advantage of the ECC agents to discover these relationships. Alternatively, the CRMP may use the managed object database which already contains data regarding these relationships. The CRMP then determines computed relationships by determining a computed relationship between a class of source storage area network component and a class of target storage area network component, wherein the computed relationship comprises a number of discovered relationships that, when combined, represent connections between one or more types of the source storage area network component and one or more types of the target storage area network component, step 802. The CRMP then stores the computed relationship, step 803, either in the managed object database or some other type of storage. Finally, the CRMP monitors discovered relationships by monitoring the discovered relationships that comprise the computed relationship for a change event, wherein a change event reflects a change in the storage area network, step 804. All other functions of the CRMP may be performed as described above with regards to storage area networks and storage area network components.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of maintaining a computed relationship between network components in a network, the method comprising:
    detecting, in the network, discovered relationships between network components in the network, wherein each discovered relationship represents a direct connection between respective network components in the network;
    determining a computed relationship between a class of source network component in the network and a class of target network component in the network, wherein the computed relationship comprises a plurality of discovered relationships that, when combined, form respective instantiations of the computed relationship between one or more types of the source network component in the network and one or more types of the target network component in the network;
    storing the computed relationship;
    monitoring the discovered relationships that comprise the computed relationship for a change event that reflects a change in the network;
    receiving notification of the change event in a discovered relationship that is part of a computed relationship;
    determining that the change event requires the computed relationship to be updated; and
    updating the stored computed relationship to reflect the change event in the network.

2. The method of claim 1 wherein receiving comprises:
    receiving notification of a new discovered relationship that may be part of a computed relationship, wherein the new discovered relationship is located at an insertion point in the computed relationship;
    and wherein updating comprises:
       traversing from the insertion point to any types of the source network component in the network and from the insertion point to any types of the target network component in the network to determine source network components in the network and target network components in the network affected by the new discovered relationship;
       determining any new combinations of discovered relationships that involve any affected source network component in the network or any affected target network component in the network; and
       updating the stored computed relationship to include any determined new combinations.

3. The method of claim 1 wherein receiving comprises:
    receiving notification of a removed discovered relationship that may be part of a computed relationship;
    and wherein updating comprises:
       traversing from a location of the removed discovered relationship to any types of source network components in the network connected through one or more discovered relationships with the removed discovered relationship;
       for each type of source network component in the network traversed to, determining each combination of discovered relationships that include that source network component in the network; and
       updating the stored computed relationship to remove any combination of discovered relationships including a source network component in the network traversed to that were not determined.

4. The method of claim 1 wherein storing comprises:
    storing the computed relationship and each instantiation of the computed relationship, wherein an instantiation of the computed relationship includes a type of source network component in the network matched with a type of target network component in the network.

5. The method of claim 1 wherein storing comprises:
storing the computed relationship and a complete path of each combination of discovered relationships that comprise the computed relationship.

6. The method of claim 5 wherein monitoring comprises:
receiving notification of a change event in a discovered relationship that is part of a computed relationship;
determining that the change event requires the computed relationship to be updated; and
updating the stored computed relationship and any stored path of a combination of discovered relationships affected by the change event.

7. The method of claim 6 wherein receiving comprises:
receiving notification of a new discovered relationship that may be part of a computed relationship;
and wherein updating comprises:
  searching each stored path of each combination of discovered relationships to determine any paths that may be modified to include the new discovered relationship;
  for each determined path, creating a new path of discovered relationships based on an existing path and the new discovered relationship; and
  updating the stored paths to include each new created path of discovered relationships.

8. The method of claim 6 wherein receiving comprises:
receiving notification of a removed discovered relationship that may be part of a computed relationship;
and wherein updating comprises:
  searching each stored path of each combination of discovered relationships for the removed discovered relationship identified in the notification; and
  updating the stored paths to remove each stored path that contains the removed discovered relationship.

9. A computer program product, stored on a non-transitory computer readable storage medium, to maintain a computed relationship between network components in a network, the computer program product comprising:
  computer program code for detecting, in the network, discovered relationships between network components in the network, wherein each discovered relationship represents a direct connection between network components in the network, by probing the network for connections;
  computer program code for determining a computed relationship between a class of network source component in the network and a class of target network component in the network, wherein the computed relationship comprises a plurality of discovered relationships that, when combined, represent connections between one or more types of the source network component in the network and one or more types of the target network component in the network;
  computer program code for storing the computed relationship;
  computer program code for monitoring the discovered relationships that comprise the computed relationship for a change event that reflects a change in the network;
  computer program code for receiving notification of the change event in a changed discovered relationship that is part of a changed computed relationship;
  computer program code for determining that the change event requires the changed computed relationship to be updated; and
  computer program code for updating the stored changed computed relationship to reflect the change event in the network.

10. The computer program product of claim 9, further comprising:
  wherein computer program code for receiving comprises:
    computer program code for receiving notification of a new discovered relationship that may be part of a computed relationship, wherein the new discovered relationship is located at an insertion point in the computed relationship;
    computer program code for receiving notification of a removed discovered relationship that may be part of a computed relationship;
  wherein computer program code for updating comprises:
    computer program code for traversing from the insertion point to any types of the source network component in the network and from the insertion point to any types of the target network component in the network to determine source network components in the network and target network components in the network affected by the new discovered relationship;
    computer program code for determining any new combinations of discovered relationships that involve any affected source network component in the network or any affected target network component in the network;
    computer program code for updating the stored computed relationship to include any determined new combinations;
    computer program code for traversing from a location of the removed discovered relationship to any types of source network components in the network connected through one or more discovered relationships with the removed discovered relationship;
    for each type of source network component in the network traversed to, computer program code for determining each combination of discovered relationships that include that source network component in the network; and
    computer program code for updating the stored computed relationship to remove any combination of discovered relationships including a source network component in the network traversed to that were not determined.

11. A computer system comprising:
  a memory;
  a processor;
  a display;
  an interconnection mechanism coupling the memory, the processor and the display allowing communication there between;
  wherein the memory is encoded with a computed relationship maintaining application, that when executed in the processor, provides a computed relationship maintaining process that maintains a computed relationship between network components in a network, by causing the computer system to perform operations of:
    detecting, in the network, discovered relationships between network components in the network, wherein each discovered relationship represents a direct connection between respective network components in the network, by probing the network for connections;
    determining a computed relationship between a class of source network component in the network and a class of target network component in the network, wherein the computed relationship comprises a plurality of discovered relationships that, when combined, represent connections between one or more types of the source network component in the network and one or more types of the target network component in the network;

storing the computed relationship;

monitoring the discovered relationships that comprise the computed relationship for a change event that reflects a change in the network;

receiving notification of the change event in a changed discovered relationship that is part of a changed computed relationship;

determining that the change event requires the changed computed relationship to be updated; and updating the stored changed computed relationship to reflect the change event in the network.

12. The computer system of claim 11, further comprising;

wherein receiving comprises:

receiving notification of a new discovered relationship that may be part of a computed relationship, wherein the new discovered relationship is located at an insertion point in the computed relationship; and receiving notification of a removed discovered relationship that may be part of a computed relationship;

and wherein updating comprises:

traversing from the insertion point to any types of the source network component in the network and from the insertion point to any types of the target network component in the network to determine source network components in the network and target network components in the network affected by the new discovered relationship;

determining any new combinations of discovered relationships that involve any affected source network component in the network or any affected target network component in the network;

updating the stored computed relationship to include any determined new combinations;

traversing from a location of the removed discovered relationship to any types of source network components in the network connected through one or more discovered relationships with the removed discovered relationship;

for each type of source network component in the network traversed to, determining each combination of discovered relationships that include that source network component in the network; and updating the stored computed relationship to remove any combination of discovered relationships including a source network component in the network traversed to that were not determined.

13. The method of claim 1, further comprising:

wherein receiving comprises receiving notification of a new discovered relationship that may be part of a computed relationship, wherein the new discovered relationship is located at an insertion point in the computed relationship; and receiving notification of a removed discovered relationship that may be part of a computed relationship;

and wherein updating comprises:

traversing first from the insertion point to any types of the source network component in the network and then traversing from the insertion point to any types of the target network component in the network to determine source network components in the network and target network components in the network affected by the new discovered relationship;

traversing from a location of the removed discovered relationship to any types of source network components in the network connected through one or more discovered relationships with the removed discovered relationship;

for each type of source network component in the network traversed to, determining each combination of discovered relationships that include that source network component in the network;

determining any new combinations of discovered relationships that involve any affected source network component in the network or any affected target network component in the network;

updating the stored computed relationship to include any determined new combinations; and updating the stored computed relationship to remove any combination of discovered relationships including a source network component in the network traversed to that were not determined.

14. The method of claim 13, further comprising:

wherein storing comprises:

storing the computed relationship and each instantiation of the computed relationship, wherein an instantiation of the computed relationship includes a type of source network component in the network matched with a type of target network component in the network; and storing the computed relationship and a complete path of each combination of discovered relationships that comprise the computed relationship;

and wherein monitoring comprises:

updating the stored computed relationship and any stored path of a combination of discovered relationships affected by the change event; wherein updating comprises:

searching each stored path of each combination of discovered relationships to determine any paths that may be modified to include the new discovered relationship;

searching each stored path of each combination of discovered relationships for the removed discovered relationship identified in the notification;

for each determined path, creating a new path of discovered relationships based on an existing path and the new discovered relationship;

updating the stored paths to include each new created path of discovered relationships; and updating the stored paths to remove each stored path that contains the removed discovered relationship.

15. The method of claim 14, further comprising:

wherein monitoring comprises:

receiving a separate notification of a change event for each different type of change event;

combining notifications of change events to include multiple notifications for change events of a same type; and in response to determining that the change event requires no update to the computed relationship, continuing to monitor the discovered relationships; and wherein each stored path represents a chain of connections that are modeled by the discovered relationships that, when joined together, show an instantiation of a computed relationship.

* * * * *